(12) United States Patent
Shipulski et al.

(10) Patent No.: US 8,981,253 B2
(45) Date of Patent: Mar. 17, 2015

(54) FORWARD FLOW, HIGH ACCESS CONSUMABLES FOR A PLASMA ARC CUTTING TORCH

(75) Inventors: E. Michael Shipulski, Etna, NH (US); Nicholas A. Sanders, Norwich, VT (US); Jay L. Jason, Claremont, NH (US); Jonathan Mather, Cornish, NH (US); Peter J. Twarog, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 755 days.

(21) Appl. No.: 13/229,105

(22) Filed: Sep. 9, 2011

(65) Prior Publication Data

US 2012/0055906 A1 Mar. 8, 2012

Related U.S. Application Data

(63) Continuation-in-part of application No. 12/878,512, filed on Sep. 9, 2010, now Pat. No. 8,624,150, which is a continuation-in-part of application No. 13/169,534, filed on Jun. 27, 2011, now Pat. No. 8,153,927, which (Continued)

(51) Int. Cl.
*B23K 10/00* (2006.01)
*H05H 1/34* (2006.01)

(52) U.S. Cl.
CPC ............... *B23K 10/00* (2013.01); *H05H 1/34* (2013.01); *H05H 2001/3442* (2013.01); *H05H 2001/3457* (2013.01); *H05H 2001/3478* (2013.01)
USPC ............... 219/121.53; 219/121.5; 219/121.51; 219/121.48

(58) Field of Classification Search
CPC ............. H05H 1/34; H05H 1/26; H05H 1/32; H05H 1/28
USPC ............... 219/121.39, 121.5, 121.51, 121.48, 219/121.49, 75; 313/231.41; 315/111.21
See application file for complete search history.

(56) References Cited

U.S. PATENT DOCUMENTS

| | | | |
|---|---|---|---|
| 4,055,741 A | 10/1977 | Bykhovsky et al. | |
| 4,781,175 A * | 11/1988 | McGreevy et al. | ............. 606/40 |
| 4,791,266 A | 12/1988 | Gérard | |

(Continued)

FOREIGN PATENT DOCUMENTS

| | | |
|---|---|---|
| EP | 0079019 | 5/1983 |
| EP | 2 255 916 | 12/2010 |

(Continued)

OTHER PUBLICATIONS

Drawings for Powermax 190C, Hypertherm, Inc., Jul. 15, 1999, 3 pages.

(Continued)

*Primary Examiner* — Mark Paschall
(74) *Attorney, Agent, or Firm* — Proskauer Rose LLP

(57) ABSTRACT

A nozzle for a plasma arc cutting torch includes a substantially hollow, elongated body capable of receiving an electrode. The nozzle body defines a longitudinal axis and has a length along the axis from a first end of the nozzle body to a second end of the nozzle body. The nozzle also includes a plasma exit orifice disposed at the first end of the body. The first end of the nozzle body has a width and a ratio of the length of the nozzle body to the width of the nozzle body is greater than about 3.

60 Claims, 15 Drawing Sheets

Related U.S. Application Data is a continuation of application No. 11/611,625, filed on Dec. 15, 2006, now Pat. No. 7,989,727, which is a continuation-in-part of application No. 12/032,630, filed on Feb. 15, 2008, now Pat. No. 8,089,025.

(60) Provisional application No. 60/825,453, filed on Sep. 13, 2006, provisional application No. 60/901,804, filed on Feb. 16, 2007.

(56) References Cited

U.S. PATENT DOCUMENTS

| | | | |
|---|---|---|---|
| 4,791,268 A | 12/1988 | Sanders et al. | |
| 4,841,114 A * | 6/1989 | Browning | 219/121.47 |
| 5,013,885 A * | 5/1991 | Carkhuff et al. | 219/121.5 |
| 5,039,837 A | 8/1991 | Nourbakhsh et al. | |
| 5,132,512 A | 7/1992 | Sanders et al. | |
| 5,132,513 A | 7/1992 | Ingwersen et al. | |
| 5,208,441 A | 5/1993 | Broberg | |
| 5,260,546 A | 11/1993 | Ingwersen et al. | |
| 5,317,126 A | 5/1994 | Couch, Jr. et al. | |
| 5,338,917 A | 8/1994 | Stuart et al. | |
| 5,591,356 A * | 1/1997 | Sakuragi et al. | 219/121.5 |
| 5,624,586 A | 4/1997 | Sobr et al. | |
| 5,628,924 A | 5/1997 | Yoshimitsu et al. | |
| 5,683,599 A | 11/1997 | Ellis | |
| 5,718,863 A * | 2/1998 | McHugh et al. | 264/309 |
| 5,726,415 A * | 3/1998 | Luo et al. | 219/121.48 |
| 5,767,478 A | 6/1998 | Walters | |
| 6,078,023 A | 6/2000 | Jones et al. | |
| 6,114,649 A * | 9/2000 | Delcea | 219/121.52 |
| 6,163,008 A | 12/2000 | Roberts et al. | |
| 6,207,923 B1 * | 3/2001 | Lindsay | 219/121.5 |
| 6,677,550 B2 * | 1/2004 | Fornsel et al. | 219/121.5 |
| 6,677,551 B2 | 1/2004 | Hardwick | |
| 6,713,711 B2 | 3/2004 | Conway et al. | |
| 6,987,238 B2 | 1/2006 | Horner-Richardson et al. | |
| 7,429,715 B2 | 9/2008 | MacKenzie et al. | |
| 7,598,473 B2 | 10/2009 | Cook et al. | |
| 7,829,816 B2 | 11/2010 | Duan et al. | |
| 2003/0052095 A1 | 3/2003 | Sanders et al. | |
| 2003/0091383 A1 | 5/2003 | Conway | |
| 2003/0160032 A1 | 8/2003 | Mackenzie et al. | |
| 2007/0082532 A1 | 4/2007 | Morris | |
| 2008/0210669 A1 | 9/2008 | Yang et al. | |
| 2008/0217305 A1 * | 9/2008 | Sanders | 219/121.49 |
| 2009/0039059 A1 | 2/2009 | Twarog et al. | |
| 2010/0078408 A1 | 4/2010 | Liebold et al. | |

FOREIGN PATENT DOCUMENTS

| | | |
|---|---|---|
| GB | 2 365 810 | 2/2002 |
| WO | 2008/033905 | 3/2008 |

OTHER PUBLICATIONS

Nozzle 360 AMP—Water Cooled, Centricut, Oct. 14, 2002, 1 page.

* cited by examiner

US 8,981,253 B2

FORWARD FLOW, HIGH ACCESS CONSUMABLES FOR A PLASMA ARC CUTTING TORCH

RELATED APPLICATIONS

This application is a continuation-in-part of U.S. patent application Ser. No. 12/878,512, filed Sep. 9, 2010, the entire disclosure of which is hereby incorporated herein by reference. This application is a continuation-in-part of U.S. patent application Ser. No. 13/169,534, filed Jun. 27, 2011, which is a continuation of U.S. patent application Ser. No. 11/611,625, filed Dec. 15, 2006, now U.S. Pat. No. 7,989,727, which claims benefit of and priority to U.S. Provisional Patent Application No. 60/825,453, filed Sep. 13, 2006, the entire disclosures of each of which are hereby incorporated herein by reference. This application is a continuation-in-part of U.S. patent application Ser. No. 12/032,630, filed Feb. 15, 2008, which claims benefit of and priority to U.S. Provisional Patent Application No. 60/901,804, filed Feb. 16, 2007, the entire disclosures of which are hereby incorporated herein by reference.

TECHNICAL FIELD

The present invention relates to consumables for a plasma arc cutting torch, and more specifically, to forward flow, high access consumables for a plasma arc cutting torch.

BACKGROUND

Plasma arc torches are widely used for the high temperature processing (e.g., cutting, welding, and marking) of metallic materials. A plasma arc torch generally includes a torch body, an electrode mounted within the body, an emissive insert disposed within a bore of the electrode, a nozzle with a central exit orifice, a shield, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive (e.g., argon or nitrogen), or reactive (e.g., oxygen or air).

In the process of plasma arc cutting or marking a metallic workpiece, a pilot arc is first generated between the electrode (cathode) and the nozzle (anode) within a torch. When operating in this pilot arc mode, the electrode can separate from the nozzle, forming an arc between the electrode and nozzle, e.g., as described in U.S. Pat. No. 4,791,268, the contents of which are incorporated herein by reference. The gas passing between the nozzle and the electrode is ionized to form a plasma, which then exits an exit orifice of the nozzle. The gas can be passed through a swirl ring to impart a tangential motion to the gas as it passes through the torch, thereby improving torch performance. When the torch is moved near a workpiece, the arc contacts the workpiece and the current return path then transfers from the nozzle to the workpiece. Generally, the torch is operated in this transferred plasma arc mode, which is characterized by the flow of ionized plasma gas from the electrode to the workpiece, with the current return path being from the workpiece back to the power supply. The plasma thus generated can be used to cut, weld, or mark workpieces.

In addition to the blowback operation described above, alternative known techniques include blow forward technologies, in which the nozzle separates from a stationary nozzle. See, e.g., U.S. Pat. No. 5,994,663, the contents of which are incorporated herein by reference.

Dimensions of the torch are determine by the size and configuration of the consumables discussed above, e.g., the electrode, swirl ring, nozzle, and shield. Design of these consumables is highly technical and has a dramatic impact on torch life and performance. The electrode is generally surrounded by a swirl ring, a nozzle, and in some configurations a shield. All of these components, and the manner in which they are designed and combined, affect the overall torch dimensions, configuration, weight, cost and other parameters.

Furthermore, hand-held torches are now being used in ever more intricate cutting operations, including those where access to portions of the workpiece can be difficult. Standard torches, due to their dimensions, may not be usable in hard to reach areas such as channels and corners. In addition, most hand-held plasma cutting torches have a torch head that is fixed at an angle between about 90° and about 115° relative to the handle. While this configuration is well suited for many cutting applications, it is not ideal for cutting into sharp corners or in pockets and for many gouging applications.

The torch consumables (e.g., the electrode, nozzle, swirl ring and shield) are exposed to high temperatures. Standard torches cannot run at a high percentage duty cycle without melting the torch components and causing other temperature-related problems in the torch. The torch consumables can be cooled utilizing various techniques, such as water injection cooling to cool the nozzle and/or shield, liquid cooling in the electrode and/or about nozzle, or vent holes to cool the shield as described in U.S. Pat. No. 5,132,512, the contents of which are incorporated herein in their entirety. The cooling of plasma arc torch consumables can become even harder when the plasma arc torch is run at high currents (e.g., greater than about 15 Amps) and/or when the plasma arc torch is entirely gas cooled.

SUMMARY OF THE INVENTION

What is needed are high-access consumables in a plasma arc torch that have the ability to plasma cut in deep channels and around hard to reach corners. For example, these high access consumables can have a longer length than known plasma arc torch consumables while maintaining adequate cooling capability when the plasma arc torch is operated such that premature failure of the consumables does not occur. What are also needed are high-access consumables in a plasma arc torch that have the ability to cut through inner and outer metal door skins from one side of the door.

However, having longer consumables can result in insufficient cooling of the plasma arc torch and the overheating and melting of the consumable parts. The over heating can be due, at least in part, to the fact that prior cooling techniques utilized a heat exchanger on the back end of the electrode, away from the insert. When the consumables are extended, this heat exchanger is moved further away from the heat source (e.g., the insert of the electrode). The further away the cooling mechanism is from the heat source, the more inefficient the cooling becomes. As a result, the extended consumables overheat and melt prematurely. This overheating is particularly pronounced when the plasma arc torch is being operated at currents above about 15 Amps, or more particularly, operated at currents above about 60 Amps. The overheating is also particularly pronounced when the plasma arc torch is entirely gas cooled (e.g., cooled by air).

It may also be desirable to have a plasma cutting torch that can operate at high cutting currents and be entirely gas-cooled without the premature failure of consumables, particularly without the premature failure of extended consumables. What is needed are consumables that are capable of operating in a hand held plasma torch with a forward-flow cooling design where substantially all of the cooling gas exits through the front of the torch tip and almost no cooling gas flows back toward a handle of the plasma torch (although blowback technology can optionally be used).

The invention, in one aspect, features a nozzle for a plasma arc cutting torch. The nozzle includes a substantially hollow, elongated body capable of receiving an electrode. The nozzle body defines a longitudinal axis and has a length (L) along the axis from a first end of the nozzle body to a second end of the nozzle body. The nozzle also includes a plasma exit orifice disposed at the first end of the body. The first end of the nozzle body has a width (W) and a ratio of the length of the nozzle body to the width of the nozzle body (L/W) is greater than about 3.

The invention in another aspect includes a method of cutting a workpiece. A plasma arc torch having a body which includes a flow path for directing a plasma gas through a swirl ring to a plasma chamber in which a plasma arc is formed is provided. A nozzle mounted relative to an electrode at a distal end of the torch body to define the plasma chamber is also provided. The nozzle includes a substantially hollow, elongated body capable of receiving the electrode. The nozzle body defines a longitudinal axis and has a length along the axis from a first end of the nozzle body to a second end of the nozzle body. The nozzle also includes a plasma exit orifice disposed at the first end of the nozzle body. The first end of the nozzle body has a width and a ratio of the length of the nozzle body to the width of the nozzle body is greater than about 3. The nozzle also includes at least one supplemental orifice disposed through at least one of an end face or a side wall of the nozzle. The at least one supplemental orifice is relative to the plasma exit orifice. The plasma arc cutting torch is operated at an amperage level of greater than about 15 Amps. Substantially all of a cooling gas is flowed through the at least one supplemental orifice at the distal end of the torch body.

The invention, in another aspect, features a nozzle assembly for a plasma arc cutting torch. The nozzle assembly includes a substantially hollow, elongated body defining a longitudinal axis and has a length along the axis from a first end of the body to a second end of the body. The nozzle assembly also includes a plasma exit orifice disposed at the first end of the body. A structure is configured to translatably receive an electrode and is integrally formed with the nozzle body. The structure includes a body with canted gas ports to provide a swirling plasma gas during operation of the plasma arc cutting torch.

The invention, in another aspect, features a method of cutting a workpiece. A nozzle assembly mounted relative to an electrode at a distal end of a torch body to define a plasma chamber is provided. The nozzle assembly includes a substantially hollow, elongated body defining a longitudinal axis and has a length along the axis from a first end of the body to a second end of the body. The nozzle assembly also includes a plasma exit orifice disposed at the first end of the nozzle body. The nozzle assembly also includes at least one supplemental orifice disposed through an end face of the nozzle assembly relative to the plasma exit orifice. A structure is configured to translatably receive an electrode and is integrally formed with the nozzle body. The structure includes a body with canted gas ports to provide a swirling plasma gas during operation of the plasma arc cutting torch. The plasma arc cutting torch is operated at an amperage level of at least about 15 Amps. Substantially all of a cooling gas is flowed through the at least one gas outlet.

The invention, in another aspect, features an electrode for a high visibility plasma arc cutting torch. The electrode includes an elongated electrode body having a first end and a second end. The electrode body defines a bore in the first end for receiving an insert and includes (i) a first body portion extending from the first end; (ii) a second body portion extending to the second end; and (iii) a heat transfer zone located relative to the first body portion at the first end of the electrode body. During operation of the plasma torch at a current greater than about 15 Amps, the heat transfer zone is in thermal communication with a cooling gas and is configured such that a majority heat generated during the operation of the plasma torch is removed from the heat transfer zone.

The invention, in another aspect, features an electrode for a high visibility plasma arc cutting torch. The electrode includes an elongated electrode body having a first end and a second end. The body defines a bore in the first end for receiving an insert. The electrode body includes (i) a first body portion extending from the first end; (ii) a second body portion extending to the second end; and (iii) a heat transfer zone located relative to the first body portion at the first end of the electrode body. The heat transfer zone is greater than about 1 square inch.

The invention, in another aspect, features a torch tip for a hand held plasma torch. The handheld plasma torch has a trigger and a torch tip mount. The torch tip includes a substantially hollow nozzle and an electrode disposed relative to the nozzle. A housing is disposed relative to the nozzle and the electrode. The nozzle, electrode and housing form an assembled torch tip having a distal end and a proximal end. The proximal end of the assembled torch tip is configured to couple to the torch tip mount. A distance from the distal end to the proximal end of the assembled torch tip is greater than about 3 inches.

The invention, in another aspect, features a torch tip for a handheld plasma torch. The handheld plasma torch has a trigger and a torch tip mount. The torch tip includes a substantially hollow nozzle and an electrode disposed relative to the nozzle. A housing is disposed relative to the nozzle and the electrode. The nozzle, electrode and housing form an assembled torch tip having a distal end and a proximal end. The proximal end of the assembled torch tip is configured to couple to the torch tip mount. The assembled torch tip defines a longitudinal axis and has a length along the axis from the proximal end to the distal end. A ratio of the length of the assembled torch tip to a width of the assembled torch tip is greater than about 3.

The invention, in another aspect, features a method of aligning an electrode in a plasma arc torch. A nozzle assembly is provided. The nozzle assembly includes a substantially hollow, elongated body capable of receiving an electrode. The body defines a longitudinal axis and has a length along the axis from a first end of the body to a second end of the body. The nozzle assembly also includes a plasma exit orifice disposed at the first end of the body. A structure is integrally formed with the nozzle body. The structure includes a body with canted gas ports to provide a swirling plasma gas during operation of the plasma arc cutting torch. An elongated electrode is disposed within the body of the nozzle. The electrode has a first end and a second end. The electrode body defines a bore in the first end of the electrode for receiving an insert. The bore of the electrode is aligned with the plasma exit orifice of the nozzle via the structure.

The invention, in another aspect, features a method for extending the life of a plasma arc torch. A torch body is provided which includes a plasma gas flow path for directing a plasma gas through a swirl ring to a plasma chamber in which a plasma arc is formed. A nozzle is provided, which is mounted relative to an electrode at a distal end of the torch body to define the plasma chamber. The nozzle includes a substantially hollow, elongated body capable of receiving the electrode. The nozzle body has a first end and a second end. The nozzle body also includes a plasma exit orifice disposed at the first end of the nozzle body, wherein the length of the nozzle body from the first end to the second end is greater than about 2 inches. At least one supplemental orifice is disposed through at least one of an end face or a side wall of the nozzle. The at least one supplemental orifice is relative to the plasma exit orifice. The plasma arc torch is operated at an amperage level of at least about 15 Amps. Substantially all cooling gas is flowed through the at least one gas outlet.

The invention, in another aspect, features, a method for extending the life of a plasma arc torch. A torch body is provided which includes a plasma gas flow path for directing a plasma gas through a swirl ring to a plasma chamber in which a plasma arc is formed. A nozzle is also provided, which is mounted relative to an electrode at a distal end of the torch body to define the plasma chamber. The nozzle includes a substantially hollow, elongated body capable of receiving the electrode. The nozzle body defines a longitudinal axis and has a length along the axis from a first end of the nozzle body to a second end of the nozzle body. A plasma exit orifice is disposed at the first end of the nozzle body. The length of the nozzle body from the first end to the second end is greater than about 2 inches. The plasma arc torch is operated at an amperage level of at least about 15 Amps. Substantially all the cooling gas is flowed out the distal end of the torch body.

In some embodiments, the nozzle also includes an end face at the first end of the body through which the plasma exit orifice is disposed and at least one supplemental orifice disposed through the end face relative to the plasma exit orifice. The at least one supplemental orifice can be canted or the at least one supplemental orifice can be linear/straight. Substantially all cooling gas can exit through the at least one supplemental orifice.

The nozzle can also include at least one orifice disposed through the body of the nozzle. The at least one orifice can be canted or the at least one orifice can be linear/straight. In some embodiments, the plasma arc torch is gas cooled. Substantially all cooling gas exits through the at least one orifice.

In some embodiments the nozzle body includes at least one supplemental orifice disposed through the end face of the nozzle. The nozzle body can include at least one orifice disposed through the body of the nozzle. In some embodiment, the nozzle body includes at least one supplemental orifice disposed through the end face of the nozzle and at least one orifice disposed through the body of the nozzle.

The nozzle can also include at least one heat exchanging element disposed on the nozzle body and in thermal communication with a cooling gas. The at least one heat exchanging element can be disposed on an outer surface of the nozzle body. The at least one heat exchanging element can be disposed on an inner surface of the nozzle body.

The length of the nozzle can be greater than about 2, 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

The ratio of the length to the width of the nozzle can be greater than about 4, 5, 6, 7, 8, 9, 10, 11, 12, 13, 14, 15, 16, 17, 18, 19, or 20. In some embodiments, the ratio of the length to the width of the nozzle is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5.

In some embodiments, any of the nozzles described herein are used in a plasma arc cutting torch. The plasma arc cutting torch can be a hand held plasma arc cutting torch.

The length of the nozzle assembly can be greater than about 2, 3, 4, 5, 6, 7, 8, 9, 10, 11, 12, 13, 14, 15, 16, 17, 18, 19, or 20 inches. In some embodiments, the length of the nozzle assembly is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

In some embodiments, the nozzle assembly also includes an end face at the first end of the body through which the plasma exit orifice is disposed and at least one supplemental orifice disposed through at least one of the end face or a side wall relative to the plasma exit orifice. The at least one supplemental orifice can be canted. Substantially all cooling gas can exit through the at least one supplemental orifice. The structure within the nozzle assembly can be capable of translatably receiving the electrode.

The nozzle assembly can also include at least one heat exchanging element disposed on the nozzle body and in thermal communication with a cooling gas. The at least one heat exchanging element can be disposed on an outer surface of the nozzle body. The at least one heat exchanging element can be disposed on an inner surface of the nozzle body.

The nozzle assembly can also include at least one orifice disposed through the nozzle body. In some embodiments the nozzle body includes at least one supplemental orifice disposed through the end face of the nozzle. The nozzle body can include at least one orifice disposed through the body of the nozzle. In some embodiment, the nozzle body includes at least one supplemental orifice disposed through the end face of the nozzle and at least one orifice disposed through the body of the nozzle.

In some embodiments, any of the nozzle assemblies described herein are used in a plasma arc cutting torch. The plasma arc cutting torch can be a hand held plasma arc cutting torch.

The heat transfer zone of the electrode can be greater than about 1 square inch. The heat transfer zone can be between about 1 square inch and about 3 square inches.

In some embodiments, any of the electrodes described herein are used in a plasma arc cutting torch. The plasma arc cutting torch can be a hand held plasma arc cutting torch.

In some embodiments, the nozzle and/or electrode are elongated. The nozzle can have a length along a longitudinal axis extending from a first end of the nozzle and a second end of the nozzle. The length from the first end to the second end of the nozzle can be greater than about 2, 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

The housing can include an adapter capable of extending the distance from the distal end to the proximal end of the assembled torch tip. The distance from the distal end to the proximal end of the assembled torch tip can be greater than about 5, 6, 7, 8, 9, 10, 11, 12, 13, 14, 15, 16, 17, 18, 19, or 20 inches. In some embodiments, the distance from the distal end to the proximal end of the assembled torch tip can be greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

In some embodiments, the torch tip also includes at least one heat exchanging element disposed on the nozzle and in thermal communication with a cooling gas. The at least one heat exchanging element can be disposed on an outer surface of the nozzle. The at least one heat exchanging element can be disposed on an inner surface of the nozzle.

BRIEF DESCRIPTION OF THE DRAWINGS

The foregoing and other objects, features and advantages of the invention, as well as the invention itself, will be more fully understood from the following illustrative description, when read together with the accompanying drawings which are not necessarily to scale.

DETAILED DESCRIPTION

Figure 1:
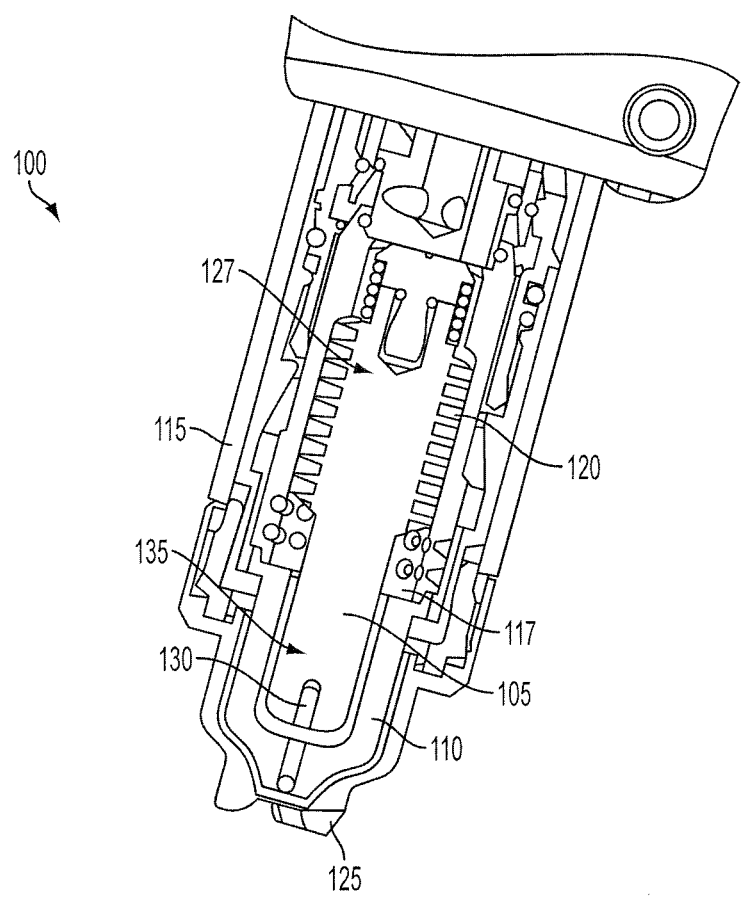
FIG. 1 is a cross-sectional view of a plasma arc torch tip.

FIG. 1 shows a cross-sectional view of a plasma arc torch 100. A plasma torch tip is comprised of a variety of different consumables, for example, an electrode 105, a nozzle 110, a retaining cap 115, a swirl ring 117, or a shield 125. The nozzle 110 has a central exit orifice mounted within a torch body. The torch and torch tip can include electrical connections, passages for cooling, and passages for arc control fluids (e.g., plasma gas). The shield 125 can be used to prevent molten spatter from damaging the other components of the torch, for example, the electrode 105, nozzle 110, retaining cap 115, or swirl ring 120. The electrode 105 can include a heat exchanger 120 at a proximal end 127 of the electrode 105.

A plasma arc torch that is capable of reaching into hard to access areas (e.g., channels or corners) can have consumables that are elongated to provide the added reach required to access these types of locations. These longer length consumables (e.g., "pointy" consumables) can also increase the visibility of an operator using the plasma arc torch. This increased visibility allows an operator to see a cut that is being made because the torch handle is further away from the cut, which creates clearance for the operator to view the cut.

However, having longer consumables can result in insufficient cooling of the plasma arc torch and the overheating and melting of the consumable parts. The over heating can be due, at least in part, to the fact that prior cooling techniques utilized a heat exchanger on the back end of the electrode, away from the insert. When the consumables are extended, this heat exchanger is moved further away from the heat source (e.g., the insert of the electrode). The further away the cooling mechanism is from the heat source, the more inefficient the cooling becomes. As a result, the extended consumables overheat and melt prematurely. This overheating is particularly pronounced when the plasma arc torch is being operated at currents above about 15 Amps, or more particularly, operated at currents above about 60 Amps. The overheating is also particularly pronounced when the plasma arc torch is entirely gas cooled (e.g., cooled by air).

Figure 2:
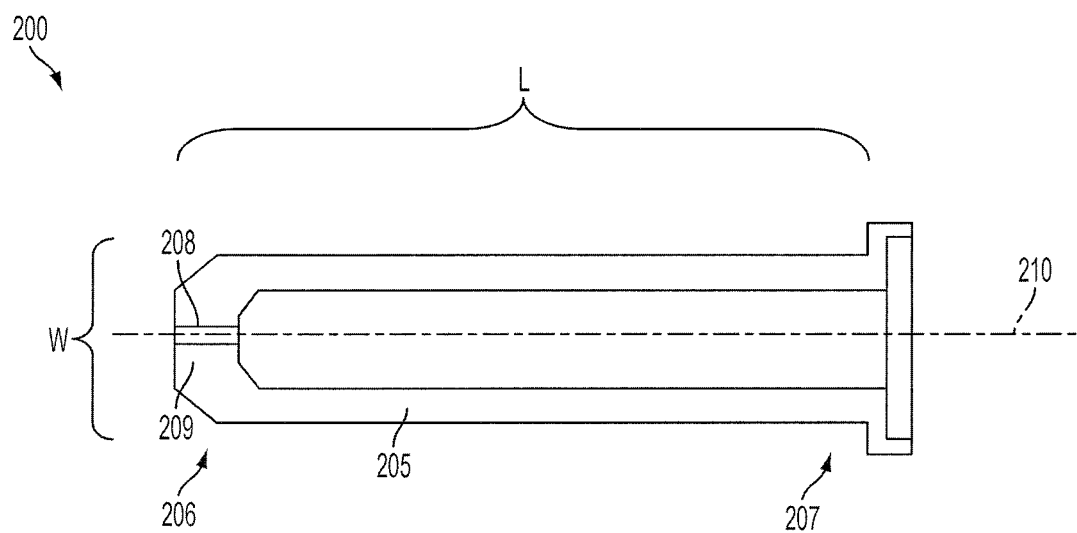
FIG. 2 is a cross-sectional view of a nozzle, according to an illustrative embodiment of the invention.

In some embodiments, the consumables (e.g., nozzle, electrode, retaining cap, shield, and/or swirl ring) are longer than about 2 inches. FIG. 2 shows a cross-sectional view of a nozzle 200. The nozzle 200 includes a body 205 that is substantially hollow with a first end 206 and a second end 207. The hollow nozzle body 205 is capable of receiving an electrode (e.g., the electrode 105 of FIG. 1). A plasma exit orifice 208 is disposed through an end face 209 at the first end 206 of the body 205.

The nozzle body 205 defines a longitudinal axis 210. The nozzle body 205 has a length L along the longitudinal axis 210 from the first end 206 to the second end 207 of the nozzle body 205. The first end 206 of the nozzle body has a width W. A ratio of the length L of the nozzle body 205 to the width W of the nozzle body 205 is greater than about 3.

For example, to have a ratio of L/W of greater than about 3, the length of the nozzle body 205 can be about 3.5 inches and the width of the nozzle body can be about 0.5 inches. This provides a ratio of L/W equal to 3.5 inches/0.5 inches or a ratio of L/W of 7.

In some embodiments the length of the nozzle can be greater than about 2 inches. The length of the nozzle can be greater than about 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the length and/or width of the nozzle, those of ordinary skill in the art would readily recognize that other lengths and widths can be used without departing from the scope of the invention. For example, the nozzle can have a length greater than about 21 inches without departing from the scope of the invention.

The ratio of the length to the width of the nozzle can be greater than about 4, 5, 6, 7, 8, 9, 10, 11, 12, 13, 14, 15, 16, 17, 18, 19, or 20. In some embodiments, the ratio of the length to the width of the nozzle is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific ratios of L/W are listed herein, those of ordinary skill in the art would readily recognize that other lengths and widths can be used without departing from the scope of the invention. For example, the nozzle can have a ratio greater than about 21 inches without departing from the scope of the invention.

Figure 3:
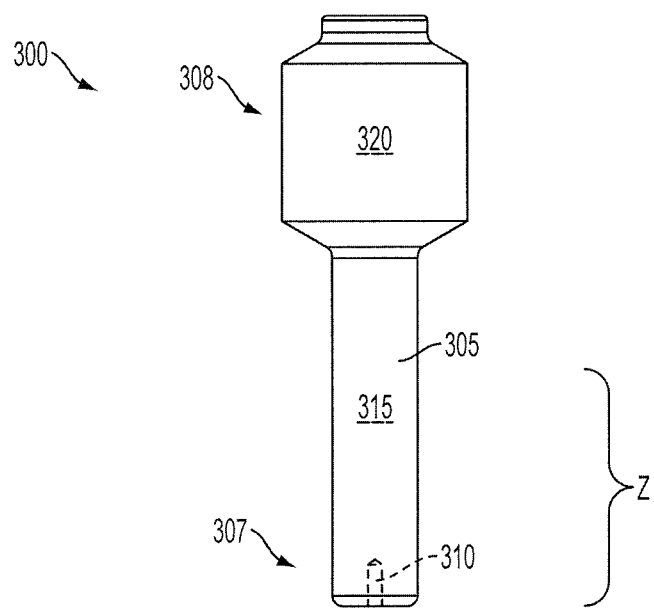
FIG. 3 is a perspective view of an electrode, according to an illustrative embodiment of the invention.

Similarly, the electrode (e.g., electrode 105 of FIG. 1) can be designed so that the plasma arc torch is capable of reaching into hard to access areas. Proper design of the electrode is a key requirement to achieving a torch stack up that has high access and high visibility features. A reliable high access and high visibility torch requires an electrode with proper ratios and tolerances. FIG. 3 shows an electrode 300 having an elongated body 305 that can achieve the high access and high visibility requirements mentioned herein. The electrode body 305 has a first end 307 and a second end 308. The electrode body 305 also defines a bore 310 in the first end 307 for receiving an insert (e.g., hafnium). The electrode has a first body portion 315 extending from the first end 307 and a second body portion 320 extending to the second end 308. The first and second body portions 315, 320, respectively, can be formed as an integral assembly, e.g., from a single piece of metal (such as copper).

Although elongating the consumables, for example, elongating the nozzle 200 of FIG. 2 and/or the electrode 300 of FIG. 3, can extend the reach, visibility and pointiness of the plasma arc torch, the life of the consumables is greatly deceased due to over heating when prior art cooling techniques are used. Prior art cooling techniques typically provide for a heat exchanger at the opposite end of the electrode as the hafnium insert. The cooling fluid performs most of its cooling function at the location of the heat exchanger. However, when the hafnium insert (e.g., the location where a substantial amount of heat is being generated), a heat exchanger located at a distance from the insert is insufficient for cooling purposes.

For example, referring to FIG. 1, elongating electrode 105 results in the hafnium insert 130 being further away from the heat exchanger 120. The heat exchanger 120, which is configured to remove heat from the electrode and other consumables when in communication with a cooling fluid, can no longer effectively remove sufficient heat from the proximal end 135 of the electrode 105, resulting in overheating and melting of the consumable parts. This overheating is particularly pronounced when the plasma arc torch is being operated at currents above about 15 Amps, or more particularly, operated at currents above about 60 Amps. The overheating is also particularly pronounced when the plasma arc torch is entirely gas cooled (e.g., cooled by air). In some embodiments, the torch is cooled by oxygen and/or nitrogen in various ratios.

To compensate for the inefficient cooling of the consumables, the consumables and cooling path can be designed so that substantially all of the cooling occurs at the front end of the torch tip near the insert of the electrode. For example, the cooling gas can flow between the electrode and nozzle, passing through a swirl ring and flowing through the plasma chamber and out the end face of the nozzle. A small portion of this gas can be carried to the nozzle orifice as a swirling cut gas. By cooling in this way, the distance from the nozzle tip to the torch can be greatly extended. This combination of long consumables with forward flow cooling provides the advantages described herein without sacrificing consumable life.

In some embodiments, substantially all of the cooling gas (e.g., a majority of the cooling gas, greater than 75% of the cooling gas, greater than about 80% of the cooling gas, greater than about 95% of the cooling gas, or about 99% of the cooling gas) exits through the front, or tip, of the plasma arc torch and almost no cooling gas is allowed to flow back into the torch (however, the pressure in the plenum chamber can still blow back this electrode to a cutting position). This new "forward flow" cooling design cools the consumables at the location where the majority of the heat of the plasma arc torch is generated (e.g., at the insert of the electrode). Therefore, the electrodes of the present invention do not require a heat exchanger at the proximal end of the electrode as shown in FIG. 1.

The electrode (e.g., electrode 300 of FIG. 3) can have a solid base with an inner hole to reduce temperature conduction within the electrode. A large temperature difference between the electrode and the cooling gas is created to drive heat into the cooling gas at the electrode tip. This drastically reduces the heat flow into the electrode body, thus extending the life of the electrode and other consumables. In addition, the plasma arc torch can operate at lower temperatures for any given gas flow and extremely high gas flows are no longer needed to adequately cool the consumables. Moreover, higher operating currents (e.g., greater than 150 Amps) can be achieved due to the drastically increased cooling of the consumables.

The forward flow cooling design also allows a workpiece to be cut without substantially heating up the torch body and handle. The heat generated by the plasma arc torch near the tip of the electrode at the insert is moved forward during cooling and is not moved backward toward the torch body and handle. This not only provides more efficient cooling, but also increases operator safety as the most likely locations an operator would touch on a plasma arc torch (e.g., the handle and torch body) are not as hot as prior art plasma arc torches. In addition, the handles of a plasma arc torch can be smaller because the handles are not required to absorb as much heat as they had to in prior art plasma arc torches. Moreover, the consumables can be made of less copper since the cooling is more efficient. For example, the back end of the electrode closest to the handle can be made of less copper than prior art electrodes since the heat generated by the plasma arc torch near the tip of the electrode at the insert is moved forward during cooling and is not moved backward toward the torch body and handle. Therefore, the consumables can be made with less copper and are less expense than prior art consumables.

In addition, the extended consumables and forward flow design of the present invention reduces the need for extremely high gas flows. With the new forward flow design, the same amount of heat can be removed from the tip of the electrode using less gas than was previously required for prior art consumable designs. This is due, in part, to the cooling gas moving in a single direction (forward, or toward the electrode insert), instead of flowing both forward and backward to cool the consumables.

Figure 4:
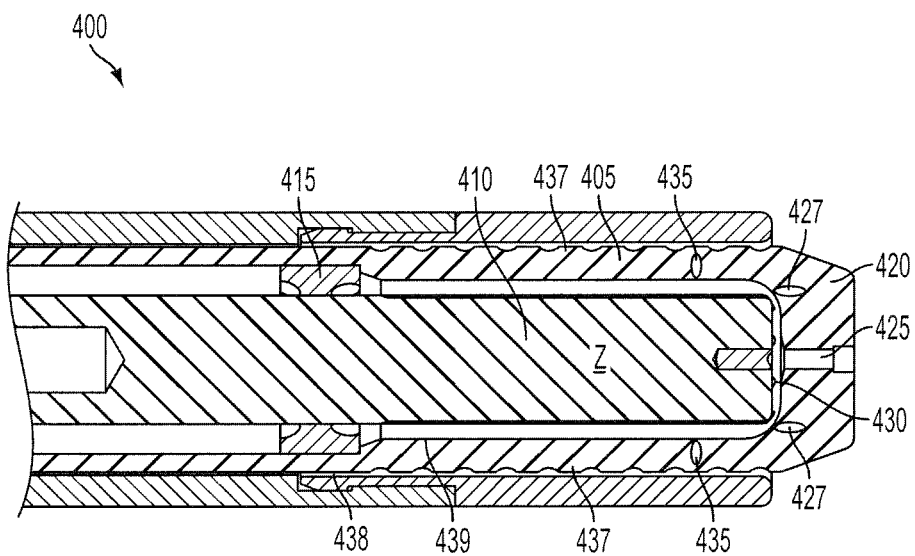
FIG. 4 is a cross-sectional view of a torch tip, including a nozzle, electrode and swirl ring, according to an illustrative embodiment of the invention.

FIG. 4 shows a torch tip 400, with elongated consumables, including a nozzle 405, electrode 410 and swirl ring 415, that can be used in a plasma arc torch operated at high currents and entirely gas cooled. The nozzle 405 has an end face 420 through which a plasma exit orifice 425 is disposed. The end face 420 can also have at least one supplemental orifice 427 disposed relative to the plasma exit orifice 425. The supplemental orifices 427 can be located beyond an end face 430 of the electrode 410.

Figure 5:
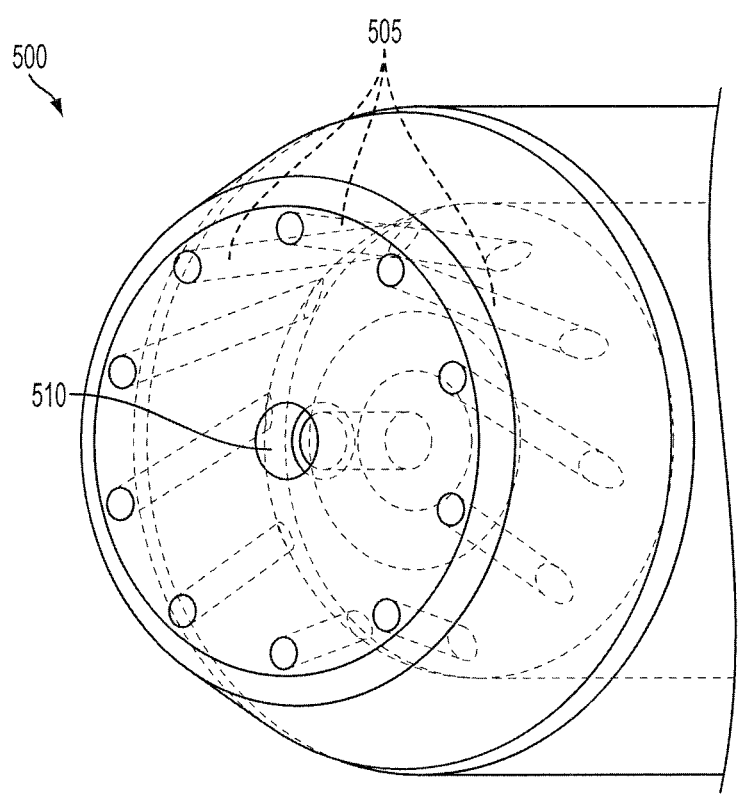
FIG. 5 is a perspective view of a nozzle, according to an illustrative embodiment of the invention.

The supplemental orifice 427 can be canted or it can be straight or linear. Canted supplemental orifices can provide a swirling component to the cooling gas exiting the nozzle to direct the cooling gas away from the cut zone. FIG. 5 shows a nozzle 500 with canted or angled supplemental orifices 505. As shown in FIG. 5, the supplemental orifices 505 are disposed relative to the plasma exit orifice 510. The plasma arc exits the plasma arc torch through the plasma exit orifice 510 when the torch is in operation. The cooling gas can exit through the supplemental orifices 505 to provide cooling at the tip of a consumable set. In some embodiments, substantially all the cooling gas (e.g., greater than about 95% of the cooling gas) exits through the supplemental orifices 505.

Referring back to FIG. 4, the body of the nozzle 405 can have at least one orifice 435 disposed there through. The nozzle 405 can have either the supplemental orifices 427 or the orifices 435. In some embodiments, the nozzle 405 has both the supplemental orifices 427 and the orifices 435. The orifices 435 can be canted/angled or straight/linear.

Substantially all the cooling gas can be used to cool the consumables at the tip of the plasma arc cutting torch and substantially all the cooling gas can exit through the supplemental orifices 427 and/or the orifices 435. In this way, all of the cooling gas is flowed down the outside of the electrode and/or the outside of the nozzle, to cool the consumables at the point where the majority of the heat is generated in the plasma arc torch (e.g., at or near the insert of the electrode). This forward flow method results in a plasma arc torch being entirely gas cooled and capable of operating at currents greater than 15 Amps (or greater than 45 Amps, or greater than 60 Amps, or greater than 90 Amps, or greater than 150 Amps) without premature consumable failure.

The supplemental orifices 427 and the orifices 435 can be sized so that substantially all of the cooling gas flows through the supplemental orifices 427 and/or the orifices 435.

To further cool the consumables, heat exchanging elements 437 can be disposed on the nozzle body. The heat exchanging elements 437 can be bumps, grooves, channels, texturing, protuberances, protrusions, and/or fins. The heat exchanging elements 437 are in thermal communication with a cooling gas and provide added surface area to increase the heat transfer coefficient and heat transfer rate. In some embodiments, the heat exchanging elements 437 are disposed on an outer surface 438 of the nozzle 405, as shown in FIG. 4. In some embodiments, the heat exchanging elements 437 are disposed on an inner surface 439 of the nozzle 405. The heat exchanging elements 437 can be disposed on both the outer surface 438 and inner surface 439 of the nozzle 405.

Figure 6:
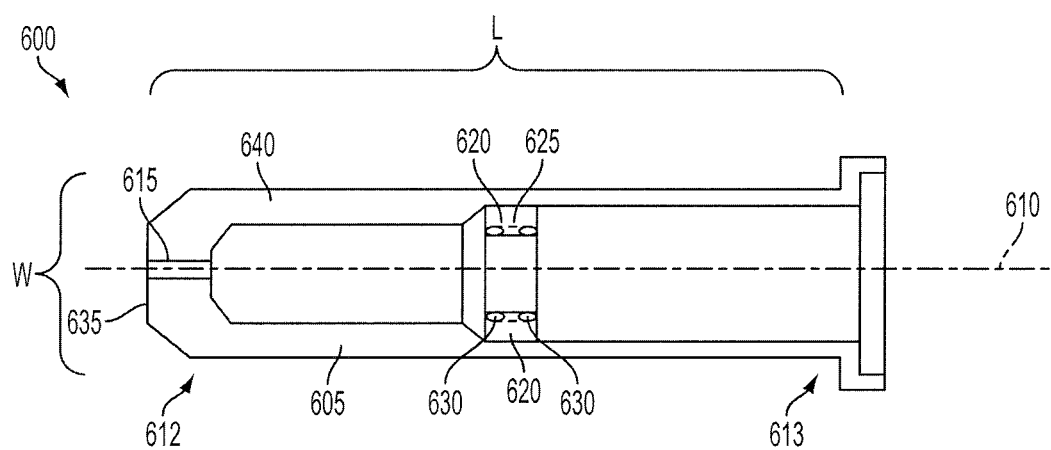
FIG. 6 is a cross-sectional view of a nozzle assembly, according to an illustrative embodiment of the invention.

In some embodiments, the nozzle can include an integrally formed structure forming a nozzle assembly 600 of FIG. 6. The nozzle assembly 600 can include a substantially hollow, elongated body 605. The elongated body 605 defines a longitudinal axis 610. The assembly body 605 has a length L only the axis from a first end 612 to a second end 613 of the body 605. The nozzle assembly 600 has a plasma exit orifice 615 disposed at the first end 612 of the body 605.

The nozzle assembly includes a structure 620 that is integrally formed with the nozzle body 605. In some embodiments, the structure 620 is removable from the nozzle body 605. The structure 620 can be, for example, a swirl ring that can control the orientation of the cooling gas flow. The structure 620 is configured to translatably receive an electrode such that blowback torch technology can be used. For example, an inner surface of the structure 620 can be a bearing surface that can allow the electrode to slide within the structure 620. The structure 620 includes a body 625 with canted gas ports 630 to provide a swirling plasma gas during operation of the plasma arc cutting torch.

The structure 620 can be embedded in the nozzle body 605, such that it is not removable. The inner diameter of the nozzle body 605 can be substantially the same as the outer diameter of the structure 620. The structure 620 can be used to align a bore of an electrode with the plasma exit orifice 615. The structure 620 can be sized such that the bore of the electrode axially aligns with the plasma exit orifice when the electrode is disposed within the hollow body of the nozzle. For example, the outer diameter of the electrode and be substantially the same as the inner diameter of the structure 620, thus aligning the electrode bore with the plasma exit orifice.

The alignment feature of the structure 620 is particularly useful when long, pointy consumables are used within a plasma arc torch. Because of the length of the consumables, the electrode can be tilted or angled with respect to a longitudinal axis 610. This tilting or angling of the electrode within the nozzle is particularly pronounced when alignment of the electrode occurs at the back or proximal end of the torch tip. When the electrode bore and plasma exit orifice of the nozzle are misaligned, double arcing or poor torch performance can occur.

To ensure proper alignment of the electrode bore and the plasma exit orifice, the structure 620 of FIG. 6 can be used to align the electrode and nozzle. As shown in FIG. 6, the alignment occurs close to the tip of the nozzle/electrode ensuring alignment of the electrode and nozzle. Moreover, aligning the electrode and nozzle at the tip of the torch aligns the electrode along the longitudinal axis 610 of the nozzle, thus decreasing or eliminating any tilting or angling of the electrode.

In addition to the aligning feature of the structure 620, the structure 620 also isolates the electrode from the nozzle. For example, the structure electrically isolates the electrode from the nozzle. The structure 620 can be for example, non-conductive (e.g., made from a non-conductive material) to electrically isolate the electrode from the nozzle.

In some embodiments the length of the nozzle assembly can be greater than about 2 inches. The length of the nozzle assembly can be greater than about 3, 4, 5, 6, 7, 8, 9, 10, 11, 12, 13, 14, 15, 16, 17, 18, 19, or 20 inches. In some embodiments, the length of the nozzle assembly is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the length and/or width of the nozzle, those of ordinary skill in the art would readily recognize that other lengths and widths can be used without departing from the scope of the invention. For example, the nozzle assembly can have a length greater than about 21 inches without departing from the scope of the invention.

The nozzle assembly can have a ratio or L/W of at least about 2. The ratio of the length to the width of the nozzle assembly can be greater than about 4, 5, 6, 7, 8, 9, 10, 11, 12, 13, 14, 15, 16, 17, 18, 19, or 20. In some embodiments, the ratio of the length to the width of the nozzle assembly is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific ratios of L/W are listed herein, those of ordinary skill in the art would readily recognize that other lengths and widths can be used without departing from the scope of the invention. For example, the nozzle assembly can have a ratio greater than about 21 inches without departing from the scope of the invention.

Similar to the nozzle 405 of FIG. 4, the nozzle assembly 600 can have at least one supplemental orifice (not shown) disposed through at least one of an end face 635 of the nozzle assembly 600 or a side wall 640 relative to the plasma exit orifice 615. The supplemental orifice can be canted and substantially all of the cooling gas can exit through the at least one supplemental orifice (located in the end face and/or the side wall of the nozzle).

The nozzle assembly 600 can have at least one heat exchanging element (not shown) disposed on the nozzle body 605 and in thermal communication with a cooling gas. The heat exchanging elements can be disposed on an outer and/or inner surface of the nozzle body 605.

Referring to FIG. 3, the electrode 300 can include a heat transfer zone Z located relative to the first body portion 315 at the first end 307 of the electrode body 305. The heat transfer zone Z can be an area of the outer surface of the electrode 300 from which heat is transferred from the electrode to a cooling gas. The area or heat transfer zone Z can include an area of any heat exchanging elements that can be disposed on the outer surface of the electrode 300 (e.g., similar to the heat exchanging elements described with respect to the nozzle). During operating of the plasma arc torch (e.g., at a current greater than about 15 Amps), the heat transfer zone Z is in thermal communication with a cooling gas and is configured such that a majority of heat generated during the operation of the plasma torch is removed from the heat transfer zone Z. The specific amount of heat removed can depend on the specific operating parameters of the plasma arc torch. For example, a torch operated at a current of about 15 Amps will require less heat to be removed from the heat transfer zone than a torch operated at a current of about 60 Amps. This is because a torch operated at a higher current generates more heat than a torch operated at a lower current. The amount of heat removed from the heat transfer zone should be sufficient to prevent premature failure (e.g., melting) of the consumables. One of ordinary skill in the art would readily appreciate the amount of heat required to be removed from the heat transfer zone to prevent premature failure of the consumables.

The heat transfer zone Z can be greater than about 1 square inch. In some embodiments, the heat transfer zone Z can be between about 1 square inch and about 3 square inches. For example, the heat transfer zone Z can be 1.1, 1.2, 1.3, 1.4, 1.5, 1.6, 1.7, 1.8, 1.9, 2, 2.1, 2.2, 2.3, 2.4, 2.5, 2.6, 2.7, 2.8, or 2.9 square inches. Although specific numbers are listed herein for the heat transfer zone of the electrode, those of ordinary skill in the art would readily recognize that other areas can be used without departing from the scope of the invention. For example, the electrode can have a heat transfer zone greater than about 3 square inches or greater than about 3.5 inches without departing from the scope of the invention. In some embodiments, the heat transfer zone is less than about 1 square inch, e.g., the heat transfer zone can be about 0.75 or 0.5 square inches.

Figure 7:
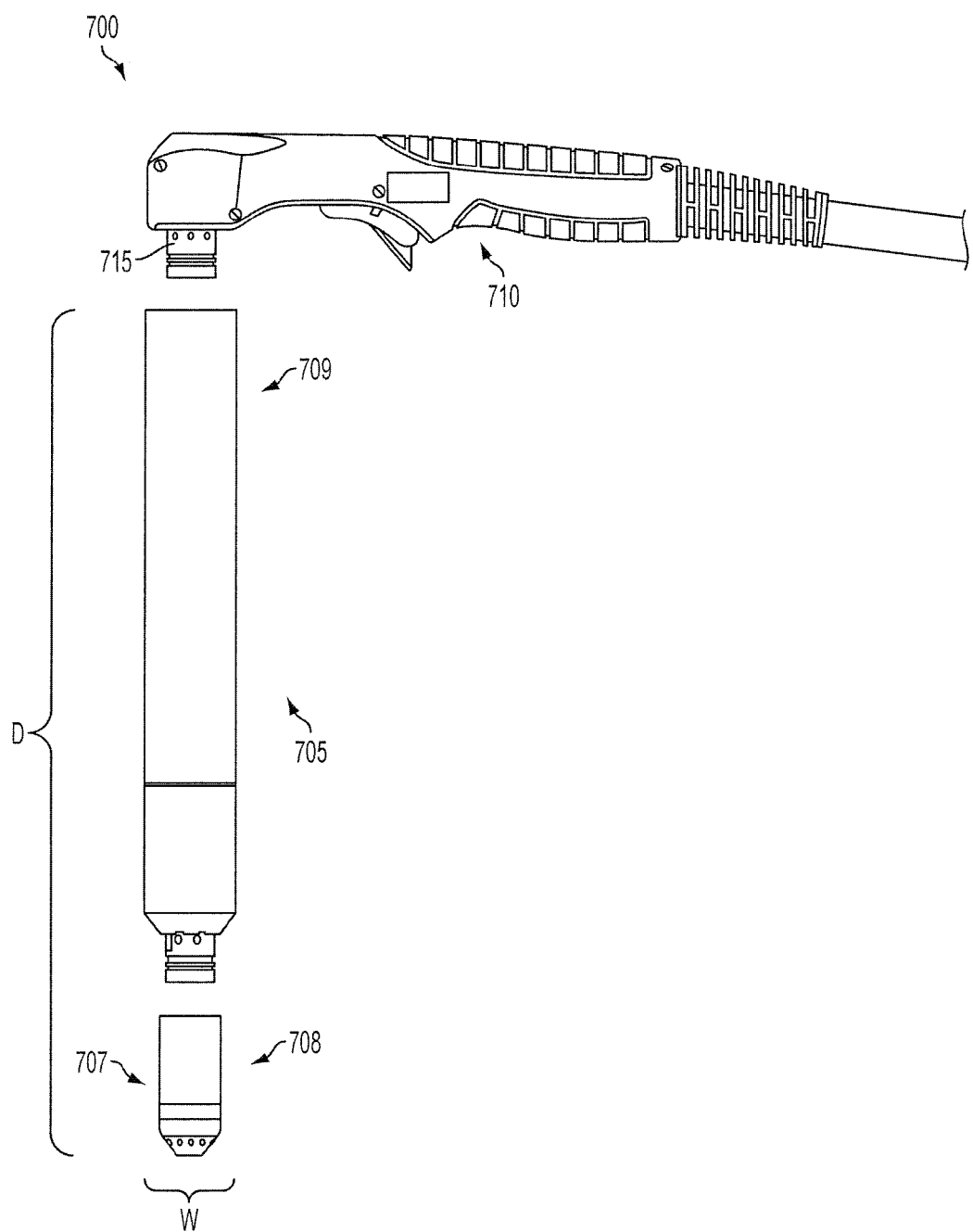
FIG. 7 is a side view of a plasma arc torch adapter for extending a plasma arc torch, according to an illustrative embodiment of the invention.

FIG. 7 shows a plasma arc torch system 700, including a housing 705 disposed relative to a consumable set 707, including a nozzle (not shown) and an electrode (not shown) of a plasma arc torch 710. The housing 705 and consumable set 707 forms an assembled torch tip having a distal end 708 and a proximal end 709. The proximal end 709 of the torch tip is configured to couple to a torch tip mount 715. For example, the proximal end 709 of the torch tip can couple to the torch tip mount 715 via threads.

The nozzle of the torch tip/consumable set 707 can be any of the nozzle embodiments described herein. The electrode of the torch tip/consumable set 707 can be any of the electrode embodiments described herein.

In some embodiments, as shown in FIG. 7, the housing 705 is an adapter or extender that can be used with prior art consumables 707 to extend the torch tip to reach into hard to access areas. For example, the housing 705 can extend the distance from the distal end 708 to the proximal end 709 of the assembled torch tip. In other embodiments, as shown in FIG. 8, elongated consumables are used and a housing 805 is used to accommodate the consumables.

Figure 8:
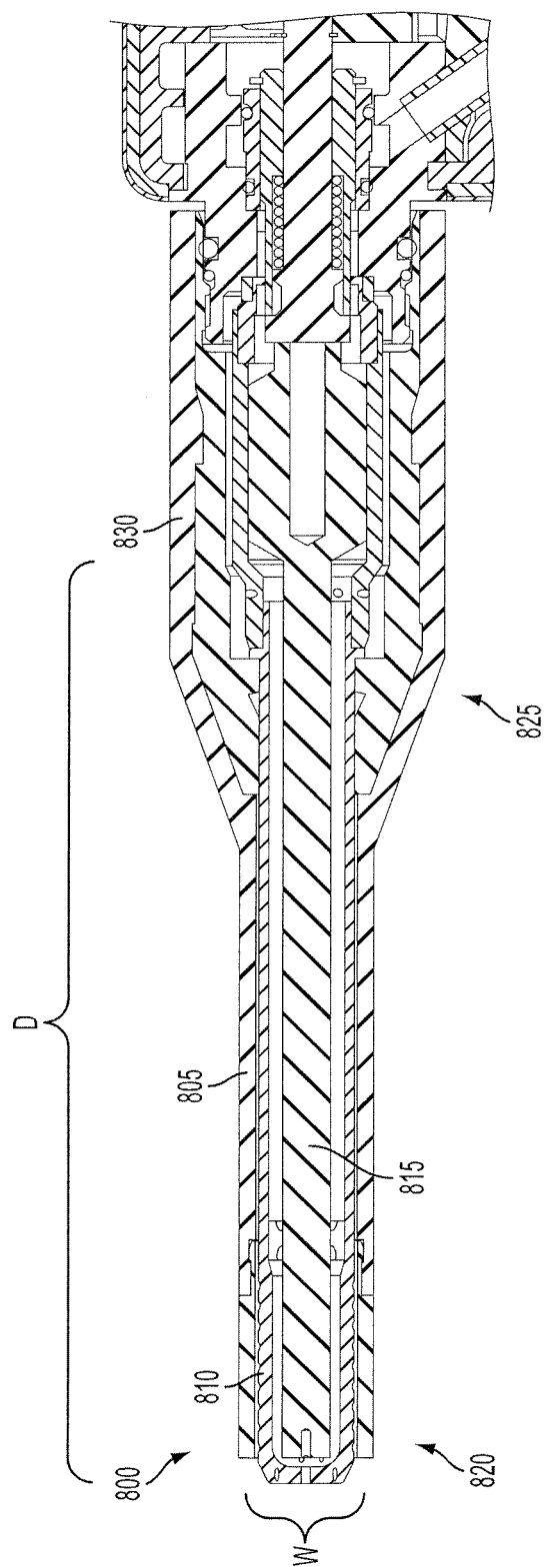
FIG. 8 is a cross-sectional view of a torch tip, according to an illustrative embodiment of the invention.

FIG. 8 shows a torch tip 800 for a hand held plasma arc torch the includes a substantially hollow nozzle 810, an electrode 815 disposed relative to the nozzle, and a housing 805 disposed relative to the nozzle 810 and the electrode 815. The nozzle 810, electrode 815, and housing 805 form an assembled torch tip having a distal end 820 and a proximal end 825. The proximal end 825 is configured to couple to a torch tip mount (not shown) of the plasma arc torch (not shown).

As shown in FIG. 8, the nozzle 810 and/or electrode 815 can be elongated. The nozzle 810 can be any nozzle embodiment described herein. The electrode 815 can be any electrode embodiment described herein. The electrode 815 can be designed such that there is no heat exchanger at the proximal end 825 of the electrode 815. The elimination of the heat exchanger at the proximal end 825 of the electrode 815 further increases the pointiness of the electrode 815.

The distance D from the distal end to the proximal end of the assembled torch tip of either of FIG. 7 or 8, can be greater than about 5, 6, 7, 8, 9, 10, 11, 12, 13, 14, 15, 16, 17, 18, 19, or 20 inches. In some embodiments, distance D from the distal end to the proximal end of the assembled torch tip of either of FIG. 7 or 8 is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the distance from the distal end to the proximal end of the assembled torch tip, those of ordinary skill in the art would readily recognize that other lengths can be used without departing from the scope of the invention. For example, the torch tip can have a length greater than about 21 inches without departing from the scope of the invention.

In some embodiments a ratio of the length D of the assembled torch tip to a width W of the assembled torch tip of either of FIG. 7 or 8 can be greater than about 3, 4, 5, 6, 7, 8, 9, 10, 11, 12, 13, 14, 15, 16, 17, 18, 19, or 20. The ratio of the length D of the assembled torch tip to a width W of the assembled torch tip of either of FIG. 7 or 8 can be greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific numbers are listed herein for the ratio, those of ordinary skill in the art would readily recognize that other ratios can be used without departing from the scope of the invention. For example, the torch tip can have a ratio greater than about 21 inches without departing from the scope of the invention.

In addition to the nozzle 810 and electrode 815 being elongated, a retaining cap 830 can also be extended to accommodate the extended nozzle 810 and electrode 815. The additional length of the retaining cap 830 can protect the consumables and/or operator. The longer consumables allow an operator to be physically farther away from the plasma arc than when prior art consumables are used resulting in greater safety for the operator. The retaining cap 830 can also allow for shield cooling flow for consumables because the inner surface of the retaining cap 830 can be used a part of the gas channel to flow gas down the shield. The retaining cap can have a plastic sheath which extends nearly the entire length of the nozzle. At the terminating end of the retaining cap (e.g., the end near the tip of the electrode and closest to the heat generation when the plasma arc torch is operated) an anodized aluminum tip can be added for heat protection. The entire outer surface of the retaining cap can then be electrically floating from the electrode and nozzle.

Figure 9:
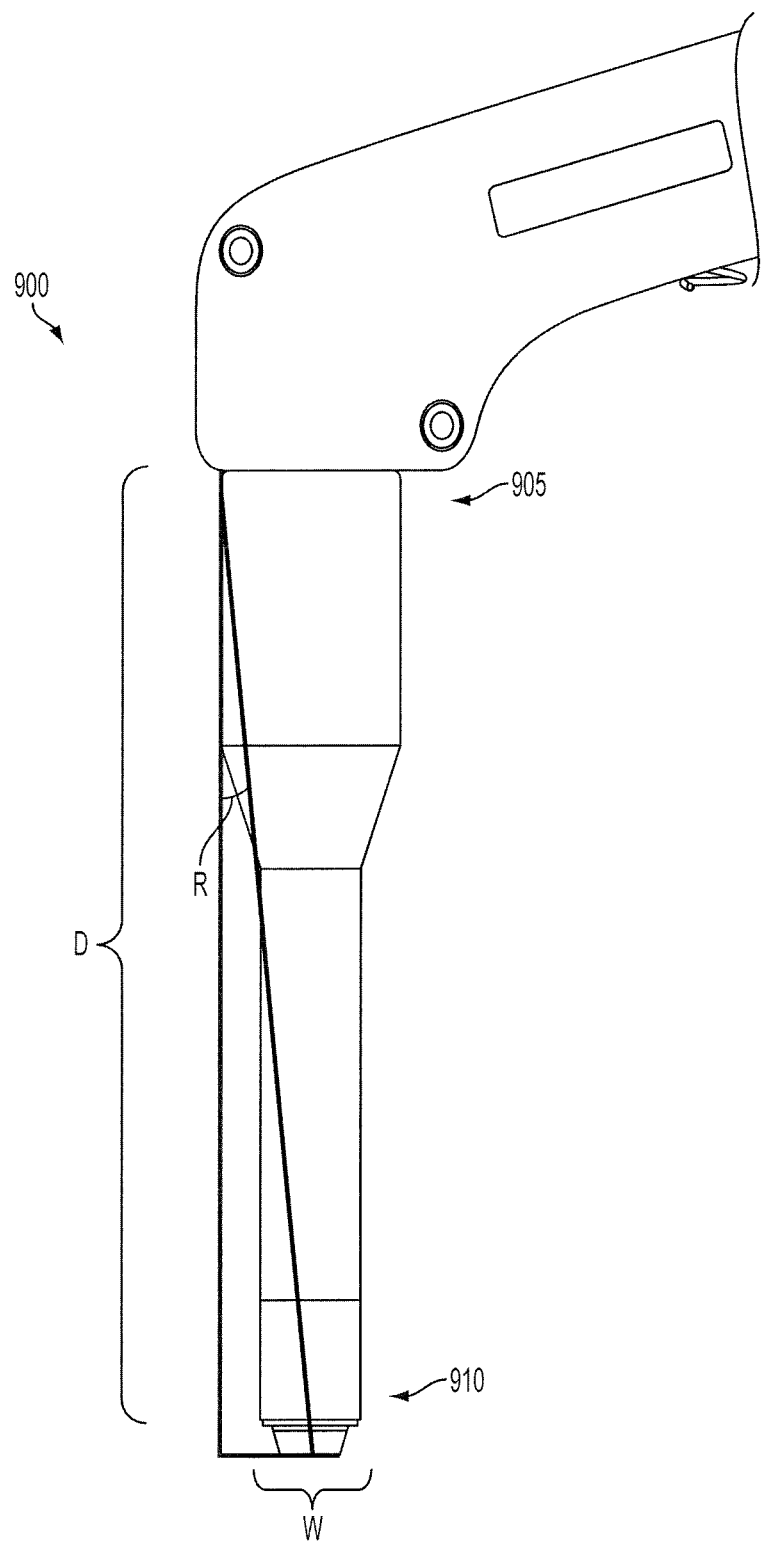
FIG. 9 is an illustration of a torch tip, according to an illustrative embodiment of the invention.

FIG. 9 shows a torch tip 900. The torch tip 900 includes an extended/elongated electrode, nozzle, and retaining cap. These extended consumables add length to the torch tip 900. For example, the extended consumables can add about 2.5 inches to standard, prior art consumables. Therefore, the distance D from the proximal end 905 to the distal end 910 of the torch tip 900 can be about 4.75 inches. The width W of the torch tip 900 can be about 0.56 inches. The small outer diameter W can allow the torch tip to reach into tight spaces. The ratio of the distance D to the width W of the torch tip 900 (4.75/0.56) is about 8.48.

The thin outer diameter or width W also increases the reach angle R of the plasma arc torch when compared to prior art torches. The reach angle R is the angle created by the widest width of the consumables and the length of the consumables as measured from a longitudinal axis of the consumables. The reach angle can be less than about 20°, less than about 15°, less than about 10° or less than about 6°.

Figure 10:
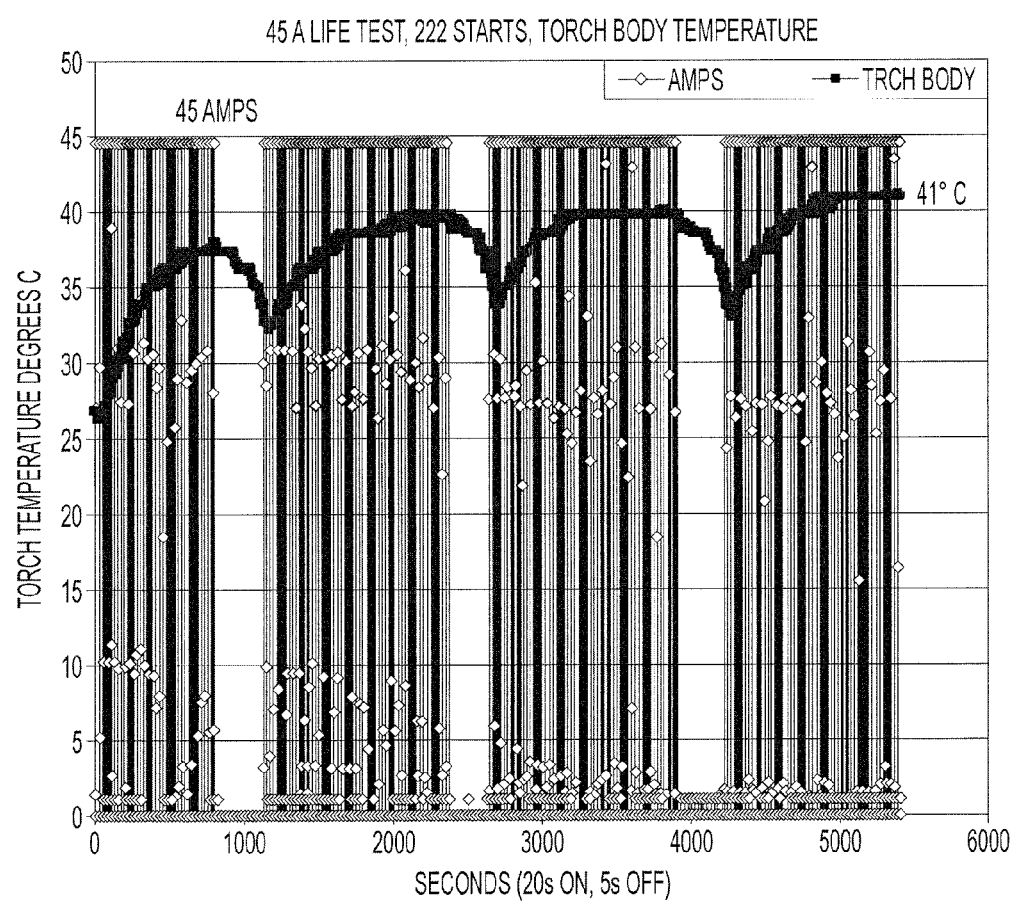
FIG. 10 is a graph showing torch body temperature versus time, according to an illustrative embodiment of the invention.
Figure 11:
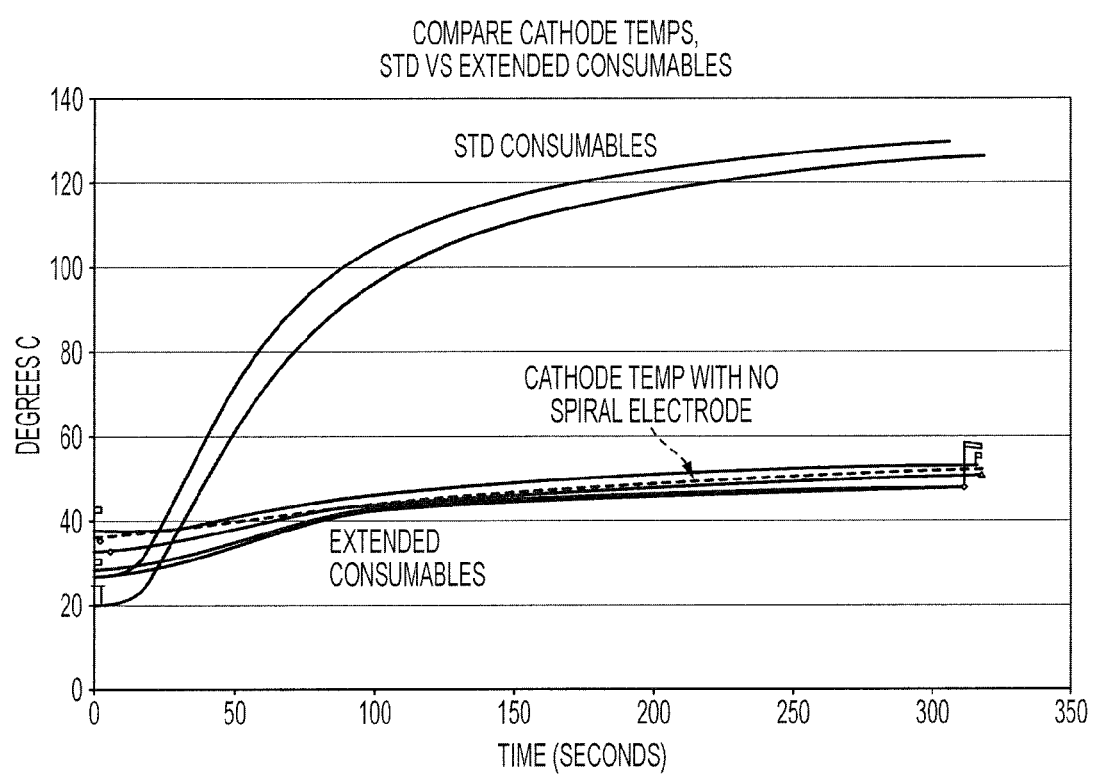
FIG. 11 is a graph showing cathode temperatures versus time, according to an illustrative embodiment of the invention.

FIGS. 10 and 11 are graphs that show how using the extended consumables with the forward flow methods described herein decrease the temperature of the plasma arc torch during operation. For example, FIG. 10 shows the torch temperature in degrees Celsius versus time during operation of a plasma arc torch at 45 Amps. The plasma arc torch was operated for 20 seconds and then shut off for five seconds. This was repeated 222 times. The large vertical gaps indicate a change in the consumable set. As shown on the graph, the highest temperature incurred by the torch body and consumables is 41° C. Prior art consumables typically reach temperatures in excess of 120° C.

FIG. 11 is a graph comparing the temperature of standard consumables to the extended consumables used with the forward flow methods described herein for a plasma arc torch operating at 30 Amps. The standard consumables reach temperatures in excess of 120° C. The highest temperature reached by the extended consumables is 54° C.

The heat transfer of the forward flow design of the consumables that provides such drastic temperature reduction in the plasma arc torch can be expressed by EQNS. 1-3, where Q is the heat into the electrode and nozzle caused by the electrical arc, A is the total (electrode and nozzle) heat transfer surface, $h_{AVG}$ is the heat transfer coefficient of the heat exchange surfaces of the electrode and nozzle, $T_{SURFACE}$ is the local surface temperature of the heat exchange surface and $T_b$ is the local bulb temp of gas (air).

$$Q = Ah_{AVG}\Delta T \qquad \text{EQN. 1}$$

$$A = A_{ELECTRODE} + A_{NOZZLE} \qquad \text{EQN. 2}$$

$$\Delta T = T_{SURFACE} - T_b \qquad \text{EQN. 3}$$

Figure 12:
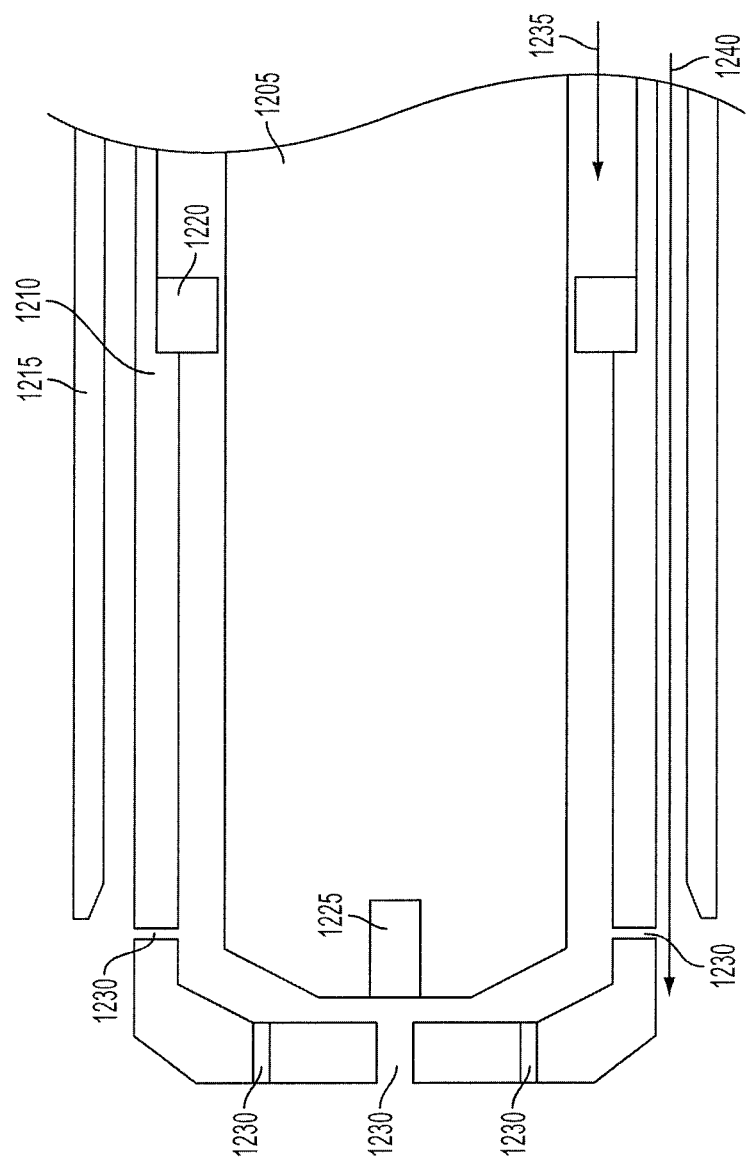
FIG. 12 is a cross-sectional view of a torch tip showing gas flow, according to an illustrative embodiment of the invention.

FIG. 12 shows a torch tip 1200 including an electrode 1205, a nozzle 1210, a shield 1215, and a swirl ring 1220. The electrode 1205 has an insert 1225, e.g., hafnium. The nozzle 1210 includes gas exits 1230. Cooling gas (e.g., air) 1235 can flow between the electrode 1205 and the nozzle 1210 and shield gas 1240 can flow between the nozzle 1210 and the shield 1215. The cooling gas 1235 and the shield gas 1240, in combination, cool the consumables at the torch tip.

Figure 13:
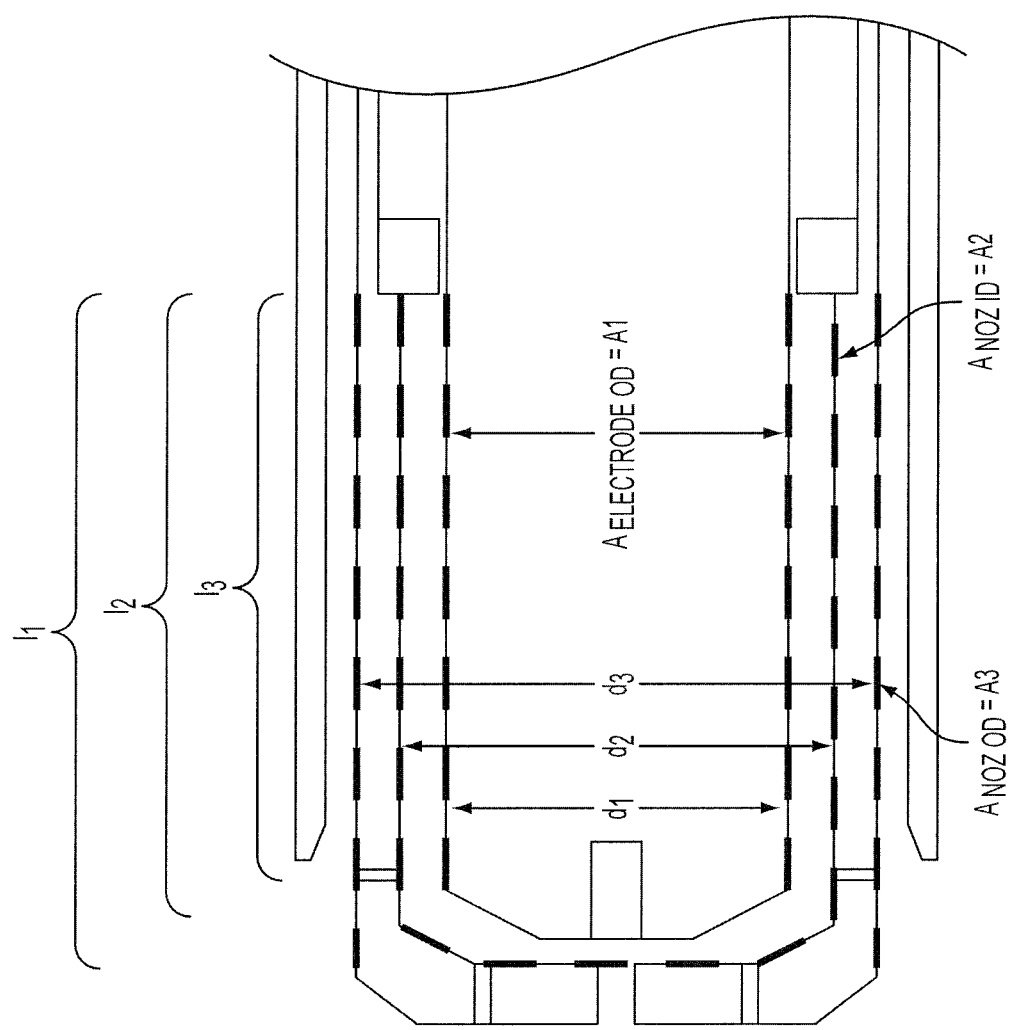
FIG. 13 is a cross-sectional view of a torch tip showing nozzle and electrode diameters and lengths, according to an illustrative embodiment of the invention.

Referring to FIG. 13, the total area of the electrode and nozzle that is the heat transfer area can be calculated based on EQNS. 4-7, where d is the diameter and l is the length.

$$A_1 = \pi d_1 l_1 = A_{Electrode\ Surface} \qquad \text{EQN. 4}$$

$$A_2 = \pi d_2 l_2 = A_{nozzle\ ID\ Surface} \qquad \text{EQN. 5}$$

$$A_3 = \pi d_3 l_3 = A_{nozzle\ OD\ Surface} \qquad \text{EQN. 6}$$

$$A = A_1 + A_2 + A_3 \qquad \text{EQN. 7}$$

Figure 14:
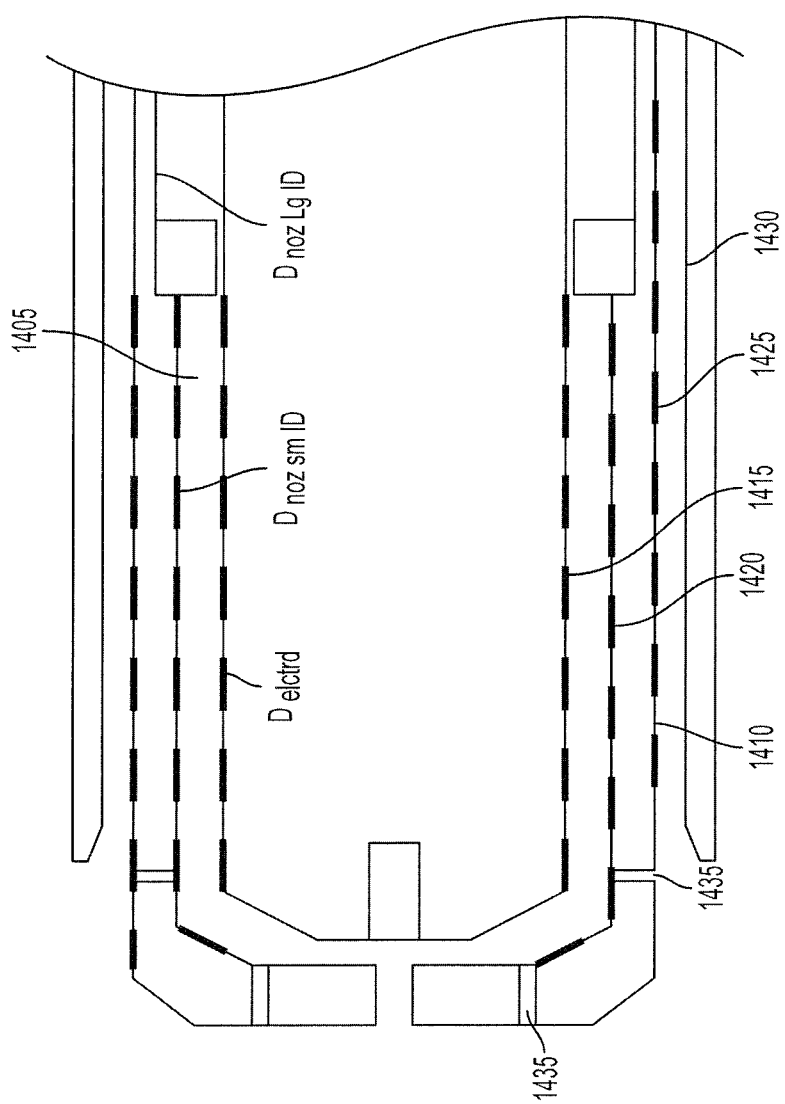
FIG. 14 is a cross-sectional view of a torch tip, according to an illustrative embodiment of the invention.

Referring to FIG. 14 and EQN. 1, there are several factors that should be taken into consideration when calculating $h_{AVG}$. First, the dimension of the gap 1405 between the nozzle inner diameter and the electrode. For example, if the diameter of the small nozzle inner diameter minus the diameter of the electrode is less than the diameter of the large nozzle inner diameter minus the diameter of the electrode (see, e.g., EQN. 8 in conjunction with FIG. 14) then a pressure drop will be created across the swirl ring that can affect the velocity and pressure of the cooling gas.

$$(D_{noz\ sm\ ID} - D_{electrd}) < (D_{noz\ lg\ ID} - D_{electrd}) \qquad \text{EQN. 8}$$

In addition, the dimension of the gap 1410 between the outer diameter of the nozzle and the shield can affect the velocity and pressure of the shield gas. Any heat exchanging features on any of the heat exchanging surfaces (outer surface of the electrode 1415, inner or outer surface of the nozzle 1420, 1425 respectively, or inner surface of the shield 1430) can create turbulence and shrink the boundary layer to increase convection in the cooling gas flow and/or shield gas flow. Moreover, the exit holes 1435 can affect the boundary layer and turbulence of the cooling gas based on the diameter and location of the exit holes 1435. Gravity and gas properties of the cooling and shield gas can also be taken into consideration when calculating $h_{AVG}$.

Figure 15:
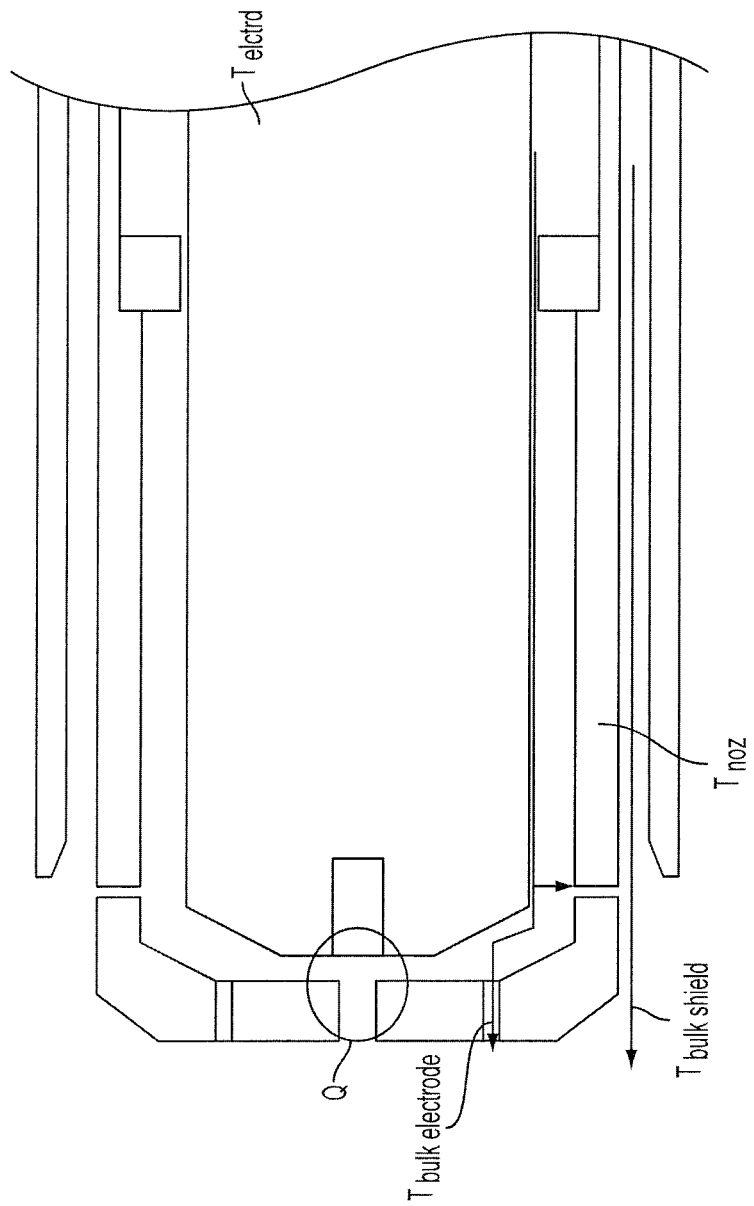
FIG. 15 is a cross-sectional view of a torch tip, according to an illustrative embodiment of the invention.

Referring to FIG. 15, the heat into the electrode and nozzle caused by the electrical arc can also be calculated by EQN 9.

$$Q = A_1 h_1 (T_{elct} - T_{bulk\ elctrd}) + A_2 h_2 (T_{noz} - T_{bulk\ elctrd}) + A_3 h_3 (T_{noz} - T_{bulk\ shield}) \qquad \text{EQN. 9}$$

Although the embodiments of the present invention are described in relation to a hand held plasma arc torch, the embodiments are equally applicable to a mechanized torch. One of ordinary skill in the art would readily understand that designing consumables and flow characteristics can be applied to both hand held and mechanized torches.

Methods of cutting workpieces and extending the life of the plasma arc torch can be performed using any of the consumables (e.g., at least one of the nozzle or electrode embodiments) and forward flow cooling methods described herein. The methods can be performed by providing a plasma arc torch that has a body. The body includes a flow path for directing a plasma gas through a swirl ring to a plasma chamber to form a plasma arc. Any one or multiple consumable embodiments described herein can be provided. For example, the nozzle of FIG. 2 can be provided, the nozzle assembly of FIG. 6 can be provided, or the electrode of FIG. 3 can be provided. In some embodiments, both the nozzle of FIG. 2 and the electrode of FIG. 3 can be provided or the nozzle assembly of FIG. 6 and the electrode of FIG. 3 can be provided.

The plasma arc torch can be operated at an amperage level of at least about 15 Amps. In some embodiments, the plasma arc torch is operated at an amperage level of at least about 30 Amps, at least about 45 Amps, at least about 60 Amps, at least about 80 Amps, at least about 100 Amps, at least about 120 Amps, at least about 150 Amps, or at least about 200 Amps.

The methods also include flowing substantially (e.g., greater than about 95%) of a cooling gas through at least one supplemental orifice at a distal end of a torch body (e.g., the supplemental orifices of the nozzle).

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A nozzle for a plasma arc cutting torch, the nozzle comprising:
   a substantially hollow, elongated body capable of receiving an electrode, the body defining a longitudinal axis and having a length and a width, the length of the body extending along the axis from a first end of the body to a second end of the body and the width of the body being width of widest portion of the nozzle body that extends along the longitudinal axis between the first end of the body and the second end of the body, wherein a ratio of the length of the nozzle body to the width of the nozzle body is greater than about 3; and
   a plasma exit orifice disposed at the first end of the body.

2. The nozzle of claim 1 further comprising:
an end face at the first end of the body through which the plasma exit orifice is disposed; and
at least one supplemental orifice disposed through the end face relative to the plasma exit orifice.

3. The nozzle of claim 2 wherein the at least one supplemental orifice is canted.

4. The nozzle of claim 2 wherein a majority of a cooling gas that cools the nozzle exits through the at least one supplemental orifice.

5. The nozzle of claim 2 further comprising at least one orifice disposed through the body of the nozzle.

6. The nozzle of claim 1 further comprising at least one orifice disposed through the body of the nozzle.

7. The nozzle of claim 6 wherein the at least one orifice is canted.

8. The nozzle of claim 6 wherein a majority of a cooling gas that cools the nozzle exits through the at least one orifice.

9. The nozzle of claim 1 further comprising at least one heat exchanging element disposed on the nozzle body and in thermal communication with a cooling gas.

10. The nozzle of claim 9 wherein the at least one heat exchanging element is disposed on an outer surface of the nozzle body.

11. The nozzle of claim 9 wherein the at least one heat exchanging element is disposed on an inner surface of the nozzle body.

12. The nozzle of claim 1 wherein the length is greater than about 2 inches.

13. The nozzle of claim 1 wherein the length is greater than about 4 inches.

14. The nozzle of claim 1 wherein the length is greater than about 6 inches.

15. The nozzle of claim 1 wherein the length is greater than about 8 inches.

16. The nozzle of claim 1 wherein the length is greater than about 10 inches.

17. The nozzle of claim 1 wherein the ratio of the length to the width is greater than about 4.

18. The nozzle of claim 1 wherein the ratio of the length to the width is greater than about 5.

19. The nozzle of claim 1 wherein the ratio of the length to the width is greater than about 7.

20. The nozzle of claim 1 wherein the ratio of the length to the width is greater than about 9.

21. The nozzle of claim 1 wherein the ratio of the length to the width is greater than about 11.

22. The nozzle of claim 1 wherein the plasma arc torch is gas cooled.

23. A plasma arc torch comprising the nozzle of claim 1.

24. A method of cutting a workpiece comprising:
providing a plasma arc torch having a body which includes a flow path for directing a plasma gas through a swirl ring to a plasma chamber in which a plasma arc is formed;
providing the nozzle of claim 1 mounted relative to an electrode at a distal end of the torch body to define the plasma chamber;
wherein at least one supplemental orifice is disposed through at least one of an end face or a side wall of the nozzle, the at least one supplemental orifice being relative to the plasma exit orifice;
operating the plasma arc cutting torch at an amperage level of at least about 15 Amps; and
flowing a majority of a cooling gas that cools the nozzle through the at least one supplemental orifice at the distal end of the torch body.

25. A nozzle assembly for a plasma arc cutting torch, the nozzle assembly comprising:
a substantially hollow, elongated body defining a longitudinal axis and having a length along the axis from a first end of the body to a second end of the body;
a plasma exit orifice disposed at the first end of the body; and
a structure configured to translatably receive a plasma arc cutting torch electrode, the structure being integrally formed with the nozzle body and comprising a body with canted gas ports to provide a swirling plasma gas during operation of the plasma arc cutting torch.

26. The nozzle assembly of claim 25 wherein the length is greater than about 2 inches.

27. The nozzle assembly of claim 25 wherein the length is greater than about 4 inches.

28. The nozzle assembly of claim 25 wherein the length is greater than about 6 inches.

29. The nozzle assembly of claim 25 further comprising:
an end face at the first end of the body through which the plasma exit orifice is disposed; and
at least one supplemental orifice disposed through at least one of the end face or a side wall relative to the plasma exit orifice.

30. The nozzle assembly of claim 29 wherein the at least one supplemental orifice is canted.

31. The nozzle assembly of claim 29 wherein a majority of a cooling gas that cools the nozzle exits through the at least one supplemental orifice.

32. The nozzle assembly of claim 25 further comprising at least one heat exchanging element disposed on the nozzle body and in thermal communication with a cooling gas.

33. The nozzle assembly of claim 32 wherein the at least one heat exchanging element is disposed on an outer surface of the nozzle body.

34. The nozzle assembly of claim 32 wherein the at least one heat exchanging element is disposed on an inner surface of the nozzle body.

35. A plasma arc torch comprising the nozzle assembly of claim 25.

36. A method of cutting a workpiece comprising:
providing the nozzle assembly of claim 25 mounted relative to an electrode at a distal end of a torch body to define a plasma chamber,
wherein at least one supplemental orifice is disposed through an end face of the nozzle assembly relative to the plasma exit orifice;
operating the plasma arc cutting torch at an amperage level of at least about 15 Amps; and
flowing a majority of a cooling gas that cools the nozzle through the at least one supplemental orifice.

37. The method of claim 36 wherein the nozzle assembly further comprises at least one orifice disposed through the nozzle body.

38. An electrode for a high visibility plasma arc cutting torch comprising:
an elongated electrode body having a first end and a second end, the body defining a bore in the first end for receiving an insert, the electrode body including:
(i) a first body portion extending from the first end;
(ii) a second body portion extending to the second end; and
(iii) a heat transfer zone located relative to the first body portion at the first end of the electrode body,
wherein during operation of the plasma torch at a current greater than about 15 Amps, the heat transfer zone is in thermal communication with a cooling gas and is configured such that a majority of heat generated during the operation of the plasma torch is removed from the heat transfer zone.

39. The electrode of claim 38 wherein the heat transfer zone is greater than about 1 square inch.

40. The electrode of claim 38 wherein the heat transfer zone is between about 1 square inch and about 3 square inches.

41. A plasma arc torch comprising the electrode of claim 38.

42. An electrode for a high visibility plasma arc cutting torch comprising:
an elongated electrode body having a first end and a second end, the body defining a bore in the first end for receiving an insert, the electrode body including:
(i) a first body portion extending from the first end;
(ii) a second body portion extending to the second end; and
(iii) a heat transfer zone located relative to the first body portion at the first end of the electrode body,
wherein the heat transfer zone is greater than about 1 square inch.

43. The electrode of claim 42 wherein the heat transfer zone is between about 1 square inch and 3 square inches.

44. A plasma arc torch comprising the electrode of claim 42.

45. A torch tip for a handheld plasma torch, the handheld plasma torch having a trigger and a torch tip mount, the torch tip comprising:
the nozzle of claim 1;
an electrode disposed relative to the nozzle; and
a housing disposed relative to the nozzle and the electrode, the nozzle, electrode and housing forming an assembled torch tip having a distal end and a proximal end, the proximal end of the assembled torch tip configured to couple to the torch tip mount,
wherein a distance from the distal end to the proximal end of the assembled torch tip is greater than about 3 inches.

46. The torch tip of claim 45 wherein the nozzle is elongated.

47. The torch tip of claim 46 wherein the nozzle has a length along a longitudinal axis extending from a first end of the nozzle and a second end of the nozzle, the length from the first end to the second end of the nozzle greater than about 2 inches.

48. The torch tip of claim 45 wherein the electrode is elongated.

49. The torch tip of claim 45 wherein the housing comprises an adapter capable of extending the distance from the distal end to the proximal end of the assembled torch tip.

50. The torch tip of claim 45 wherein the distance from the distal end to the proximal end of the assembled torch tip is greater than about 5 inches.

51. The torch tip of claim 45 wherein the distance from the distal end to the proximal end of the assembled torch tip is greater than about 7 inches.

52. The torch tip of claim 45 wherein the distance from the distal end to the proximal end of the assembled torch tip is greater than about 9 inches.

53. The torch tip of claim 45 wherein the distance from the distal end to the proximal end of the assembled torch tip is greater than about 11 inches.

54. The torch tip of claim 45 further comprising at least one heat exchanging element disposed on the nozzle and in thermal communication with a cooling gas.

55. The torch tip of claim 54 wherein the at least one heat exchanging element is disposed on an outer surface of the nozzle.

56. The torch tip of claim 55 wherein the at least one heat exchanging element is disposed on an inner surface of the nozzle.

57. A torch tip for a handheld plasma torch, the handheld plasma torch having a trigger and a torch tip mount, the torch tip comprising:
the nozzle of claim 1;
an electrode disposed relative to the nozzle; and
a housing disposed relative to the nozzle and the electrode, the nozzle, electrode and housing forming an assembled torch tip having a distal end and a proximal end, the proximal end of the assembled torch tip configured to couple to the torch tip mount, the assembled torch tip defining a longitudinal axis and having a length along the axis from the proximal end to the distal end,
wherein a ratio of the length of the assembled torch tip to a width of the assembled torch tip is greater than about 3.

58. A method of aligning an electrode in a plasma arc torch, the method comprising:
providing the nozzle assembly of claim 25;
disposing an elongated electrode within the body of the nozzle, the electrode having a first end and a second end, the electrode body defining a bore in the first end of the electrode for receiving an insert; and
aligning the bore of the electrode with the plasma exit orifice of the nozzle via the structure.

59. A method for extending the life of a plasma arc torch, the method comprising:
providing a torch body which includes a plasma gas flow path for directing a plasma gas through a swirl ring to a plasma chamber in which a plasma arc is formed;
providing the nozzle of claim 1 mounted relative to an electrode at a distal end of the torch body to define the plasma chamber,
wherein the length of the nozzle body from the first end to the second end is greater than about 2 inches; and
wherein the nozzle comprises at least one supplemental orifice disposed through at least one of an end face or a side wall of the nozzle, the at least one supplemental orifice relative to the plasma exit orifice;
operating the plasma arc torch at an amperage level of at least about 15 Amps; and
flowing a majority of a cooling gas that cools the nozzle through the at least one gas outlet.

60. A method for extending the life of a plasma arc torch, the method comprising:
providing a torch body which includes a plasma gas flow path for directing a plasma gas through a swirl ring to a plasma chamber in which a plasma arc is formed;
providing the nozzle of claim 1 mounted relative to an electrode at a distal end of the torch body to define the plasma chamber,
wherein the length of the nozzle body from the first end to the second end is greater than about 2 inches;
operating the plasma arc torch at an amperage level of at least about 15 Amps; and
flowing a majority of a cooling gas that cools the nozzle out the distal end of the torch body.

* * * * *

UNITED STATES PATENT AND TRADEMARK OFFICE
CERTIFICATE OF CORRECTION

PATENT NO.        : 8,981,253 B2
APPLICATION NO.   : 13/229105
DATED             : March 17, 2015
INVENTOR(S)       : Shipulski et al.

It is certified that error appears in the above-identified patent and that said Letters Patent is hereby corrected as shown below:

On the Title Page

On page 2, under the "Related U.S. Application Data" column, line 3, delete "Pat. No. 7,989,727, which" and insert --Pat. No. 7,989,727. This application--.

Signed and Sealed this
Twenty-first Day of July, 2015

Michelle K. Lee
*Director of the United States Patent and Trademark Office*